United States Patent [19]
Fantone et al.

[11] Patent Number: 6,026,215
[45] Date of Patent: Feb. 15, 2000

[54] METHOD FOR MAKING DISPLAY PRODUCTS HAVING MERGED IMAGES

[75] Inventors: Stephen D. Fantone, Lynnfield; Daniel J. Braunstein, Arlington, both of Mass.

[73] Assignee: Insight, Inc., Lynnfield, Mass.

[21] Appl. No.: 08/990,688

[22] Filed: Dec. 15, 1997

[51] Int. Cl.⁷ .................................................. G06F 15/00
[52] U.S. Cl. .......................... 395/102; 355/22; 345/435
[58] Field of Search .................................. 395/101, 102, 395/106, 109, 111, 117; 358/515, 525, 530, 538, 401, 448, 462; 355/22, 33; 353/32; 40/454; 396/306, 307, 308, 327, 330, 331, 332, 333; 430/1, 2, 228, 946; 348/59; 359/455, 462, 463, 619, 621

[56] References Cited

U.S. PATENT DOCUMENTS

| | | | |
|---|---|---|---|
| Re. 35,029 | 8/1995 | Sandor et al. | 355/22 |
| 3,264,164 | 8/1966 | Jevothe et al. | 428/29 |
| 4,935,335 | 6/1990 | Fortland | 430/324 |
| 5,113,213 | 5/1992 | Sandor et al. | 355/22 |
| 5,276,478 | 1/1994 | Morton | 355/22 |
| 5,278,608 | 1/1994 | Taylor et al. | 355/22 |
| 5,349,419 | 9/1994 | Taguchi et al. | 355/22 |
| 5,494,445 | 2/1996 | Sekiguchi et al. | 434/365 |
| 5,588,526 | 12/1996 | Fantone et al. | 206/308.1 |
| 5,600,402 | 2/1997 | Kainen | 355/22 |
| 5,647,151 | 7/1997 | Fantone et al. | 40/454 |
| 5,823,344 | 10/1998 | Fantone et al. | 206/459.5 |
| 5,850,913 | 12/1998 | Fantone et al. | 206/308.1 |

Primary Examiner—Scott Rogers
Assistant Examiner—Gabriel I. Garcia
Attorney, Agent, or Firm—Francis J. Caufield

[57] ABSTRACT

A method for making display products that generate special visual effects with autostereographic, dynamic, alternating, animated, and morphed images used in conjunction with lenticulated arrays for marketing and informational purposes. The special imaging effects, which can be integrated with discrete lenticulated container structures for data storage media and other contents, are achieved by digitally sampling and formatting source images with resampling procedures and then generating a merged image file that serves as the digital input for color printers or digital printing presses. The sampled images are printed on substrates along with registration lines or on preperforated stock preformatted for use with a corresponding lenticulated component. Afterwards, the images are separated from the substrate by either cutting them from the substrate using the printed registration lines as guides or breaking them out along the preperforated lines. In either case, the image is separated along with surrounding structure as needed to provide an intermediate image bearing subassembly that is then further folded or otherwise configured for combination with its lenticulated plastic counterpart, preferably formed by injection molding. The lenticulated plastic components are configured to either act as a receptacle for the intermediate image subassembly or to attach to it. The resampling procedures are designed so that each image segment is sampled over an interval equivalent to the full width of an individual lenticule behind which it is intended to reside but the image data obtained for printing is fit to just that fraction of the lenticule width corresponding to the space allocated based on the number of interlaced images.

8 Claims, 18 Drawing Sheets

METHOD FOR MAKING DISPLAY PRODUCTS HAVING MERGED IMAGES

FIELD OF THE INVENTION

This invention in general relates to display products and in particular to methods by which display products employing lenticular arrays and merged images can be rapidly fabricated.

BACKGROUND OF THE INVENTION AND PRIOR ART

Methods using selector screens in conjunction with interlaced images to provide special visual effects to the unaided eye are well-known and have been in use for some time now to create such special effects as autostereoscopic images (3D) or multiple images angularly separated so that a different image is seen from different perspectives. Such methods differ in the structure of the selector screen and the way in which the images are formed and optically registered with the screen. In common use as screens are parallax barrier strips and lenticular arrays. To separate the available images for presentation to the eye, barrier strips rely on occlusion while lenticular arrays operate by refraction. Even though individual screen mechanisms may differ, all nevertheless fundamentally act as an intermediary between the viewer and the available images to select what is displayed to each eye from different perspectives.

Parallax barriers consist of a series of alternating fine opaque stripes and slits that are parallel to one another. Typically, the slits are transparent regions in an otherwise opaque substrate. The barrier is usually forward of the plane containing the interlaced images whose spatial frequency is arranged in correspondence with that of the barrier's alternating stripes and slits so that one or more left and right stereo pairs are presented, respectively, to the left and right eye for orthoscopic or normal stereographic images or completely arbitrary images may be similarly presented where different messages are to be conveyed along different angles of projection. Alternatively, pseudoscopic images where depth relationships are reversed may be formed by reversing the correct orientation of left and right stereo image pairs images.

Parallax barrier displays are capable of high-quality imagery and, in the case of autostereographic images, have an advantage over other techniques because they do not require the viewer to use visual aids to sort out stereo pairs. Their main disadvantage is that their opaque regions inherently block light from illuminating the image while performing their image selection function. Consequently, the images are typically dim and usually require back lighting of some sort to make up for deficient front illumination.

Lenticular arrays do not suffer from the brightness problems of the barrier systems. These typically consist of a series of parallel cylindrical lenses that are rolled or embossed on plastic or injection molded. Parallel light enters from the front surface, focuses on the focal plane behind each lenticule, is modulated by the image resident there, and returns back out through the lenticule along predetermined angles of separation corresponding to the interlacing scheme preselected to provide autostereographic or multiple image effects.

Both types of screens require more or less precise registration of the interlaced images with the screen structural features to provide the desired visual effect and the demands on tolerancing increases with the number of images and the length of the screen elements whether barrier or lenticule. To achieve the degree of registration required, a number of approaches have been used. Where the images are to be formed on photographic materials such as light sensitive emulsions or photoresistive materials, the images are typically formed in place, in situ, by exposing first one and then the other through the screen from angular locations in front of the screen corresponding to the angular perspectives from which the different images are to be observed. After exposure, the images are developed or otherwise converted from latent images to visible ones, and the images are more or less perfectly registered because they have been exposed in a completely reversible way. In situ exposure techniques suffer from the liability that they require a great deal of time and special equipment to make, and the images and screen are permanently joined together.

Other faster techniques, such as those described in U.S. Pat. Nos. 5,113,213 issued to Sandor, et al. on May 12, 1992 and entitled COMPUTER-GENERATED AUTOSTEREOGRAPHY METHOD AND APPARATUS and its reissue Re. No. 35,029 issued on Aug. 29, 1995 rely on high-speed web-process in which preprinted interlaced images are merged with lenticular arrays. The interlaced images themselves are generated by a computer and reproduced via a high-resolution printing process. Here, the substrate on which preprinted images are formed is provided with a guide line that is monitored via feed back techniques to assure that the longitudinal axes of the lenticules are aligned with the guide line which is, in turn, aligned with the lengthwise orientation of the interlaced images. The lenticules are formed in a softened uv-curable plastic just prior to being mated with the interlaced images and after the two are brought together, the lenticules are exposed to uv-radiation to harden them in place over the interlaced images. Again, the images and lenticules form an integrated whole that can not be separated without damage, and such a process is not amenable to making structures that perform integral packaging functions along with imaging functions.

Sekiguchi, et al. in U.S. Pat. No. 5,494,445 issued on Feb. 27, 1996 entitled PROCESS AND DISPLAY WITH MOVEABLE IMAGES describe a computer based process in which images are cut and pasted while viewed on a monitor to form interlaced images which are afterwards printed. Here, the process requires the images to be observed while being manipulated and original image content is inherently discarded.

It is thus a primary object of the present invention to provide a process for fabricating images for producing special visual effects when coupled with lenticular products that can act as displays or part of a packaging system.

It is another object of the present invention to provide a method by which original images can be reassembled as composite special effects images by resampling procedures that preserve original image content.

It is yet another object of the present invention to provide techniques by which special effects images can be generated easily for use with preformatted lenticulated plastic products particularly suitable for mass distribution.

Other objects of the invention will, in part, be obvious and will, in part, appear hereinafter when the following detailed description is read in conjunction with the drawings.

SUMMARY OF THE INVENTION

A method for making images that exhibit special visual effects that are at once eye-catching and yet aesthetically pleasing. The special visual effects use autostereographic, dynamic, alternating, animated, text, and/or morphing images in conjunction with lenticulated arrays. The lenticulated arrays are preferably molded of plastic as part of displays or packaging systems to provide enhanced informational, entertainment, and marketing possibilities. The special imaging effects, which can be integrated with discrete lenticulated container structures for data storage media and other contents, are achieved by digital resampling original images and then reassembling them through merging procedures as composite special effects images while preserving original image content. The merged images are reformatted to fit a wide variety of plastic lenticulated products and are then stored as a special image file or passed along for printing on substrates along with registration lines or on preperforated stock preformatted for use with a corresponding preformatted lenticulated counterpart or correctly sized stock with or without a border and a reference edge. Afterwards, the images are separated from the substrate by either cutting them from the substrate using the printed registration lines as guides or breaking them out along the preperforated lines. In either case, the image is separated along with surrounding structure as needed to provide an intermediate image bearing subassembly that is then further folded or otherwise configured for combination with its lenticulated plastic counterpart preferably formed by injection molding. The lenticulated plastic products are configured to either act as a receptacle for the intermediate image subassembly or to attach to it. The resampling procedures are designed so that each interlaced image segment is sampled over a interval equivalent to the full width of an individual lenticule behind which it is intended to reside but the image data obtained for printing is fit to just that fraction of the lenticule width corresponding to the space allocated based on the number of original images scheduled for the composite.

BRIEF DESCRIPTION OF THE DRAWINGS

The structure and operation of the invention, together with other objects and advantages thereof, may best be understood by reading the detailed description in connection with the drawings in which unique reference numerals have been used throughout for each part or step and wherein.

DETAILED DESCRIPTION

Figure 1:
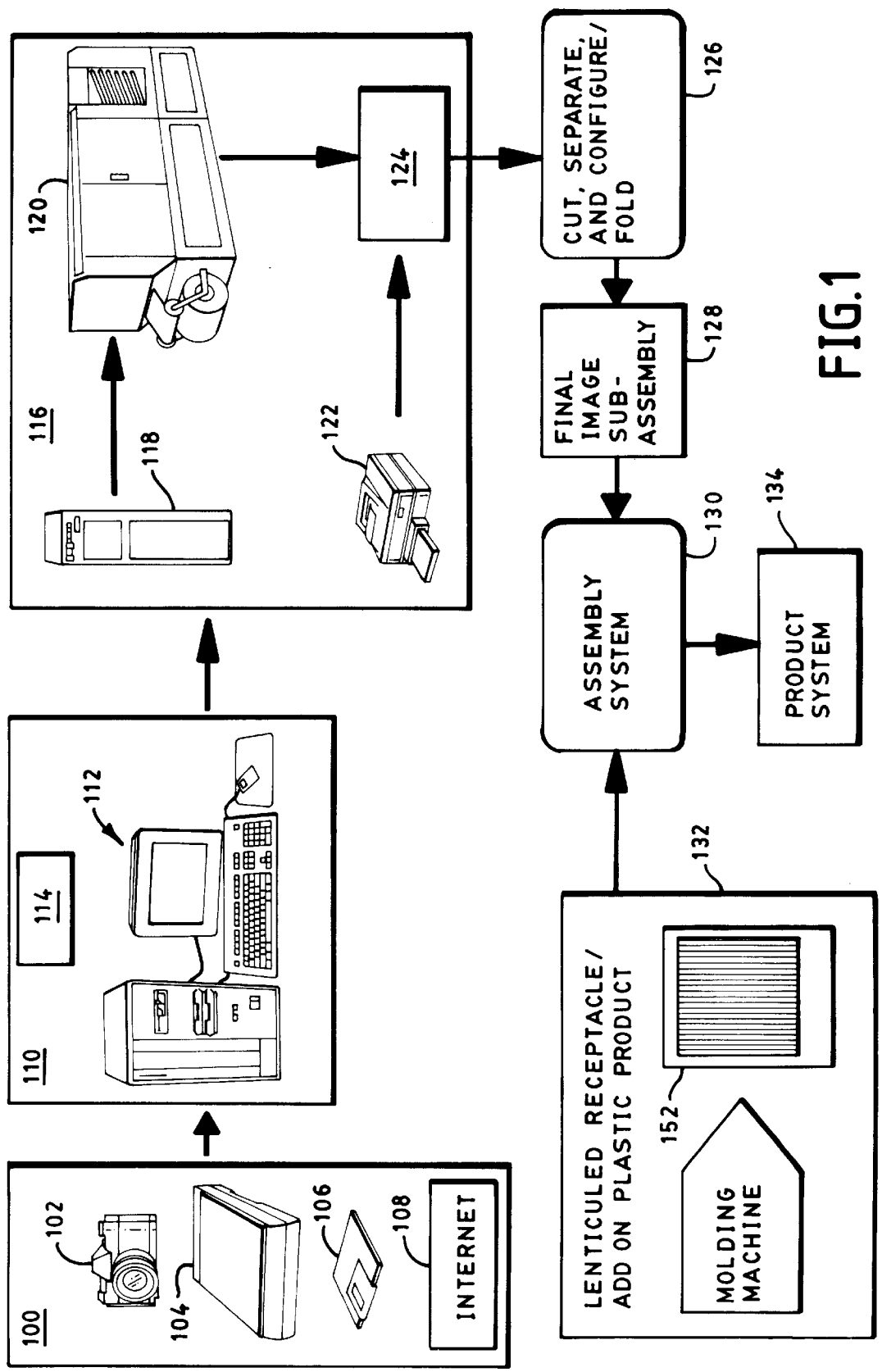
FIG. 1 is a high level block diagram showing the major elements of the method of the invention.

Referring now to FIG. 1, there is shown a high level block diagram illustrating the major elements of the method of the invention for fabricating display or packaging products that exhibit special visual effects that are at once eye-catching and aesthetically pleasing. As can be seen there, the major elements of the method comprise an image acquisition step for importing original images, portions of which are to be resampled for digital assembly into a composite image that is to be printed and combined in optical registration with a lenticulated screen to provide the special visual effects. The original images, which may comprise stereographic perspectives, planar images of different scenes or objects, text, corporate logos, computer generated graphics, are preferably acquired in the form of digital input signals formatted as a plurality of image data points corresponding, respectively, to the individual image pixels. The source of the original images may be a digital camera 102, a digitizing or rasterizing scanner 104, storage medium such as the floppy disk 106 or the like (e.g. ZIP disk), or an upstream port such as the Internet indicated at 108. Obviously, the original images may be generated with computer graphics programs, pictorial image processing or rendering programs such as Adobe Photoshop® or 3D design and animation programs such as Ray Dream Studio 5, or CAD software programs. The input image signals or digital files may be accompanied by header information in conventional file formats such as TIFF, GIF, PCX, BMP, or JPEG.

The input signals are imported into a computer or workstation system 112 which comprises conventional elements by which a user may issue commands to on-board software, such as the "merge software program" of the present invention. Preferably, the operating system for the computer system 112 comprises Windows 95 or NT so that the operator interface is a graphical user interface (GUI).

Once the input files of the original images have been acquired and are resident on the computer system 112, they are operated on by the user in the manner to be described to generate a "merge" file that represents a composite image that is preferably provided with appropriate header information such as the filenames of the original images and the processing steps used to generate the merge file (filename.mrg). The output merge file may be formatted in conventionally available formats such as TIFF, PCX, BMP, JPEG, or PostScript for subsequent downstream uses such as storage or to serve as the input to a printing step such as that designated in box 116.

As seen, the printing step of the invention may be implemented via an image setter 118 having an on-board RIP in conjunction with a printing press 120 or via a desktop printer 122 such as a color inkjet or laser printer. Examples of the latter include the HP 890Cse, the Epson 1440, Cannon MultiPass C3000, Epson Stylus Photo Printer, and the Color LaserJet 5. In addition, it will be appreciated that dye sublimation or thermal dye transfer printers may also serve as printers, and manufacturers of acceptable quality printers of this type include Kodak, Panasonic, Olympus, Hewlett Packard, and Tektronix. For mass market applications, however, particularly desktop publishing environments or consumer applications, inkjet printers are preferable in terms of quality and cost.

The printed merged composite image is printed by one of the foregoing printers preferably on sheet stock 124 with preformatted perforation lines or along with pre-established registration lines or edges or other indicia. More will be said about this in connection with FIG. 2.

After the composite image is printed, it is then separated from the full sheet 124 to its intended configuration for further work as shown in box 126. The composite image is either cut away from the unwanted portions of printed sheet 124 or broken away through the use of the provided perforations. The material composition of the sheet stock 124 should be appropriate for the adopted printer and final display or packaging application. For example, use of special inkjet printer paper may be most appropriate for applications requiring optimal results where photorealism is desired. However, card stock may be an acceptable trade off where other functional requirements are to be achieved. If an offset press is to be used, stock for that environment will be the best choice.

After the composite image is separated for its surrounds on sheet 124, it may be further processed by folding or be otherwise configured for the subsequent downstream use to provide an intermediate final image subassembly such as that designated at 128. By way of example, final image assembly may comprise a composite image area along with other areas (developments) which, when folded, provide a packaging sleeve such as those shown in FIGS. 13, 14, 15, and 16.

Final image subassembly 128 may be combined with any number of pre-designed lenticulated plastic products 132, preferably from a plastic injection molded machine, to form the final display or packaging product designated at 134. As will be seen subsequently, plastic product(s) 134 generally fall into one of two general categories, either that of a receptacle for receiving printed inserts or as an add-on that attaches to final image subassembly 128.

Figure 2:
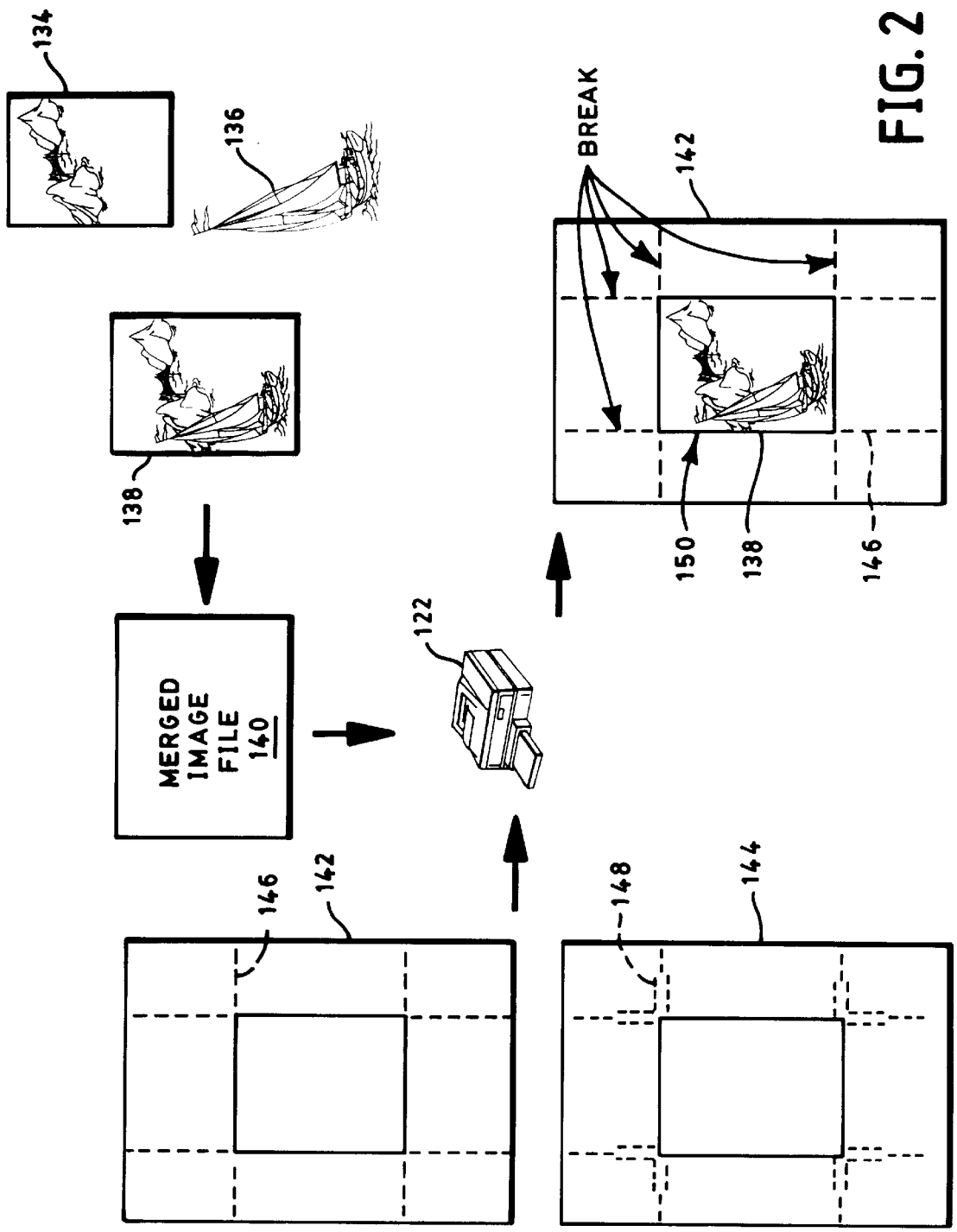
FIG. 2 is a block diagram illustrating a subset of the elements of FIG. 1.

Referring now to FIG. 2, there is illustrated the steps of the overall method which are used to merge original images to form a composite one and then print the composite image on preformatted image substrates that have been configured for use with corresponding plastic products and which have been designated by the user. As shown, original images may comprise planar images such as that designated at 134 which shows two bay islands connected by a bridge or that designated by 136 which shows a sailboat to windward close-hauled and perhaps intended to convey the notion that it would pleasant to sail the bay of image 134.

Original images 134 and 136 are digitally merged in the manner of the resampling procedures to be described to generate composite image 138, also in the form of a digital file now designated at 140 and sent to printer 122 along with other instructions for its reproduction in hardcopy form. Printing of composite file 140 is preferably onto preselected sheet stock such as that shown at 142 and 144. Sheet 142 is provided in the form of preperforated stock with perforations 146 corresponding to one of the formats for a plastic lenticulated product. If not to be used, the user has the option of printing image 138 on unperforated stock to which registration lines 148 are added to provide visual aids for cutting out the image and its associated portions to the accuracy required for alignment purposes as discussed below. Cutting may be through the use of cutting boards, dies, or even a straight edge and knife. As mentioned before, the printed image may be made on correctly sized surrounded or not with a border and having a reference edge or features defining a reference line.

Once composite image 138 is available in hardcopy form on perforated sheet stock 142 as shown, it may be easily separated by breaking along perforation lines 146. Once broken away, one of the edges such as that designated at 150 serves as a registration line for mating with complementary structure in its plastic counterpart to align the composite image with the longitudinal axes of the lenticules included in the plastic injection molded product. The preferred rotational tolerance for the overall alignment is to have an adopted longitudinal axis of the lenticules be aligned with the length of an image in a preferred direction be within: (W/n) over the length of the image where W is the width of an individual lenticule and n is the number of original images to be merged. A typical lenticule spatial frequency is 50 lenticules/inch which makes the width 0.020 inches per lenticule. If two original images are to be merged, that sets the runout over the image length at 0.010 inches. Obviously, the longer the image, the more difficult it is to maintain the angular alignment relationship, so whatever, printer is used must be capable of printing more accurately than the final rotational tolerance to take into account any additional rotational misalignments attributed to variability of complementary structure in plastic product.

While original example images 134 and 136 represent planar images of two different scenes, it will be recognized that they may equally well have been images of the same scene from different perspectives in which case the merged composite images would serve as the source of an autostereographic view.

Figure 3:
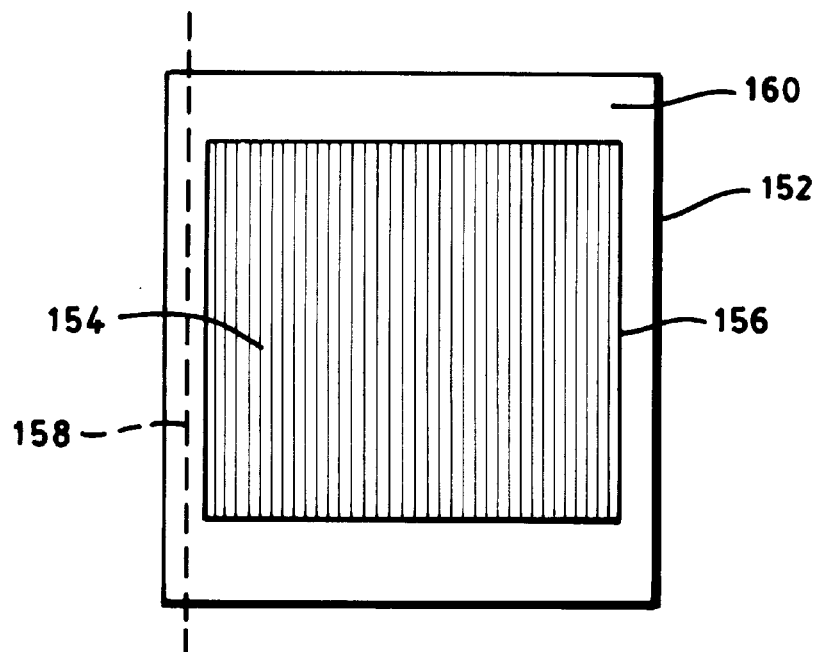
FIG. 3 is a diagrammatic view showing a generic plastic lenticulated product used in the method of FIG. 1.

FIG. 3 shows in diagrammatic fashion a generic plastic lenticulated product used in the method of the invention. While all of the plastic lenticulated products that can be used with corresponding final image subassemblies 128 share common features with one another, they differ depending on their final intended purpose. Common features, of course, include a series of parallel lenticules 154 arranged in an array and preferably of the type shown in more detail in FIGS. 7 and 9. In cross-section, individual lenticules are convex-plano lens forms where the composite image 138 resides in or near the focal plane defined by the collective focal lines of the array of lenticules 154. The maximum array area 156 corresponds to that area through which image content in the focal plane can be projected to exhibit special imaging effects to an observer. Surrounding lenticulated area 156 typically is other structure, surround area 160, that differs in detail from one plastic product to another but typically provides a locating and/or attachment function by which the lenticulated area 156 may be aligned with the preferred printing orientation of the composite images, including its individual original image segments, or the structure carrying the lenticulated may be attached to another structure in a packaging system.

The surround area 160 also typically carries a locating means for establishing a registration line 158 that is complementary to that of the final image subassembly 128. Line 158 need not physically be a linear structure but rather can be, or example, two separated locating bumps molded to establish a line against which the corresponding line in the final image subassembly 128 may but to establish the tolerances required. In addition, it is necessary to have the printed image 138 reside in the collective focal plane of the lenticulated product area 156 to within tolerances established by the depth of field of the individual cylindrical lenticular lenses and the scale of details within the merged image hardcopy. Examples of such structures may be found in commonly owned U.S. Pat. Nos. 5,588,526 and 5,647,151 and Copending application Ser. Nos. 08/508,380, 08/778, 975, 08/772,968, 08/876,912, and 08/764,788, all of which are incorporated by reference herein.

Figure 4:
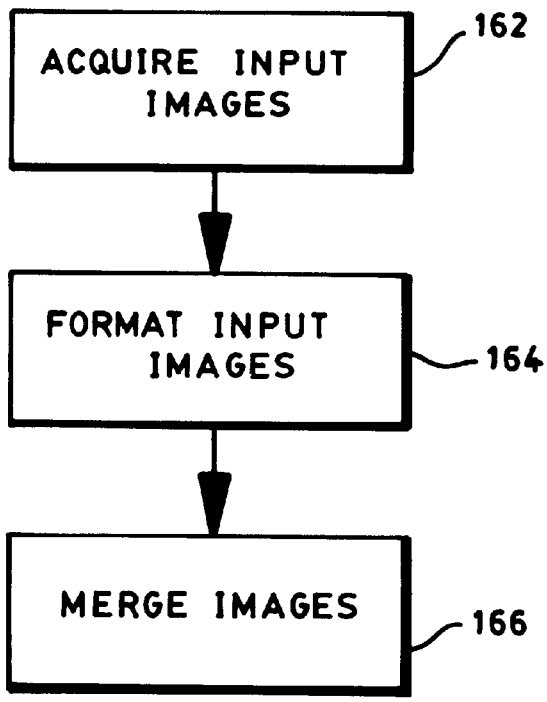
FIG. 4 is a high level flowchart of the major steps in an image processing portion of the invention.

Reference is now made to FIG. 4 which is a high level flowchart of the major steps in an image processing portion of the invention. Specifically, the purely image processing steps of the invention fundamentally involve first acquiring the original images as digital input signals as indicated in box 162. Afterwards, the digital input signals are formatted as indicated in box 164 and then merged as indicated in box 166. These major image processing steps are carried out by the user via computer 112 with the merge software 114 of the invention.

Figure 5:
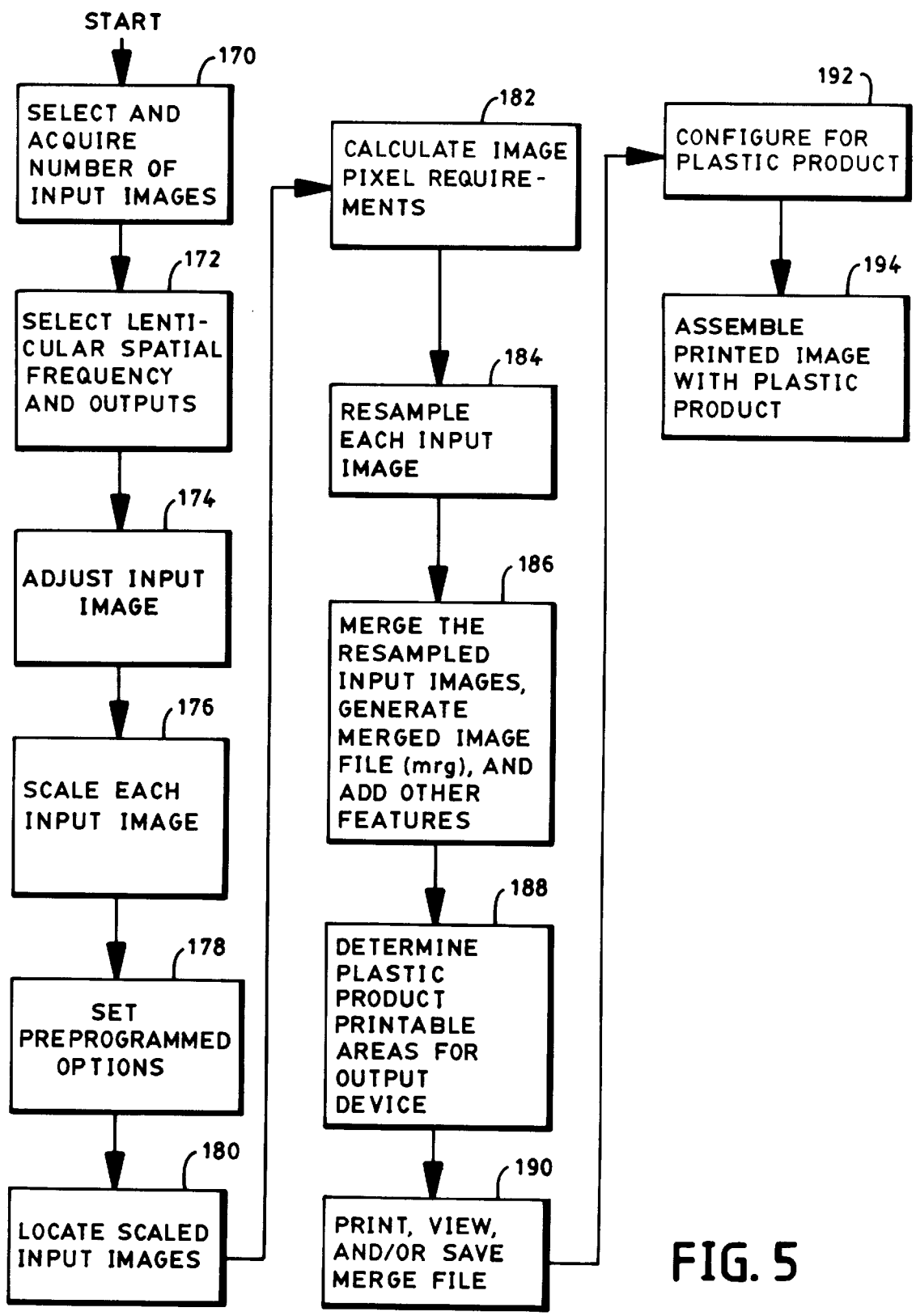
FIG. 5 is a flowchart for a computer program that may be used in carrying out an image processing portion of the invention.
Figure 6A:
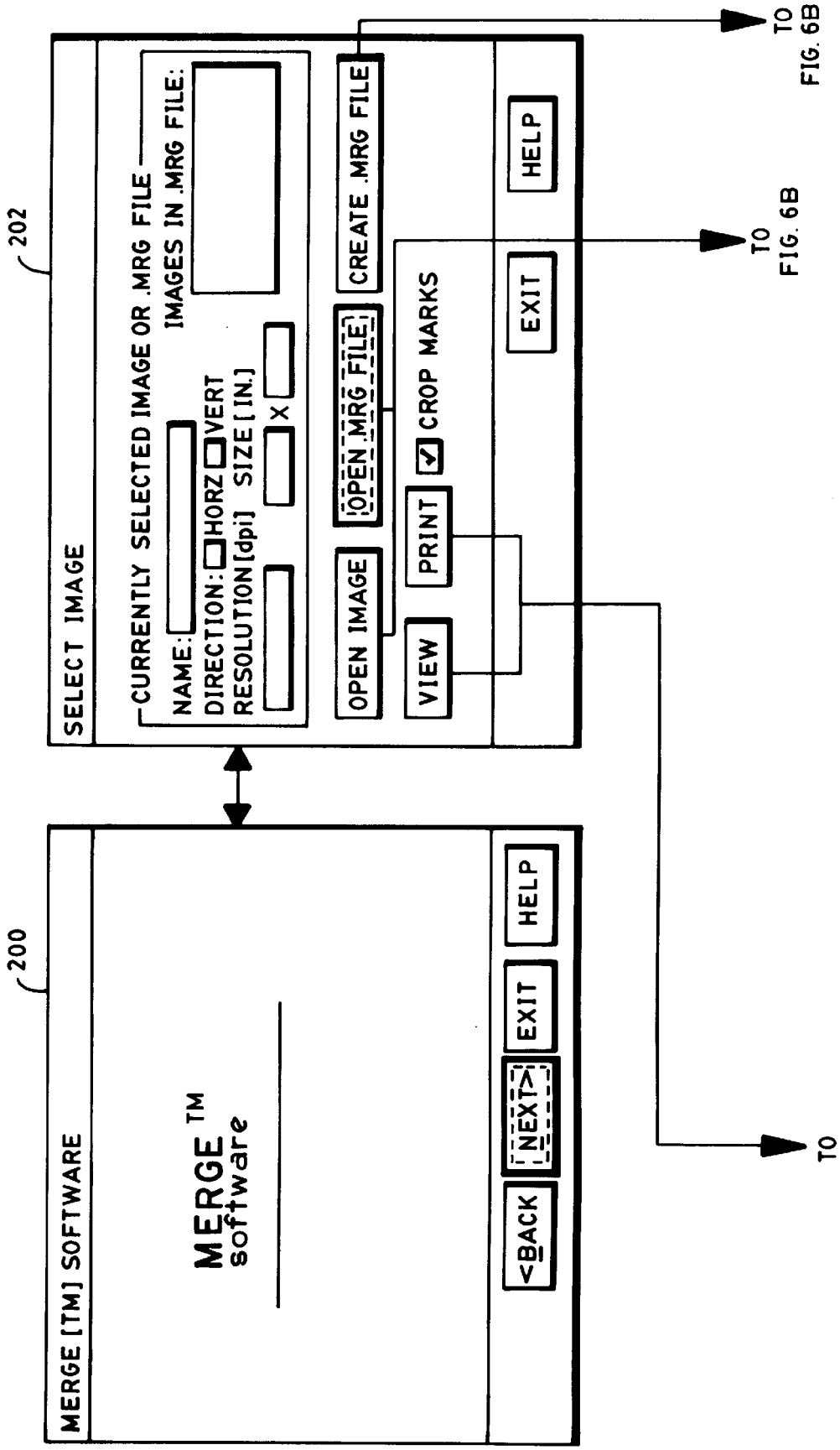
FIGS. 6A–6C are a flowchart/screen arrangement of an implementation of the image processing program of the invention.
Figure 6B:
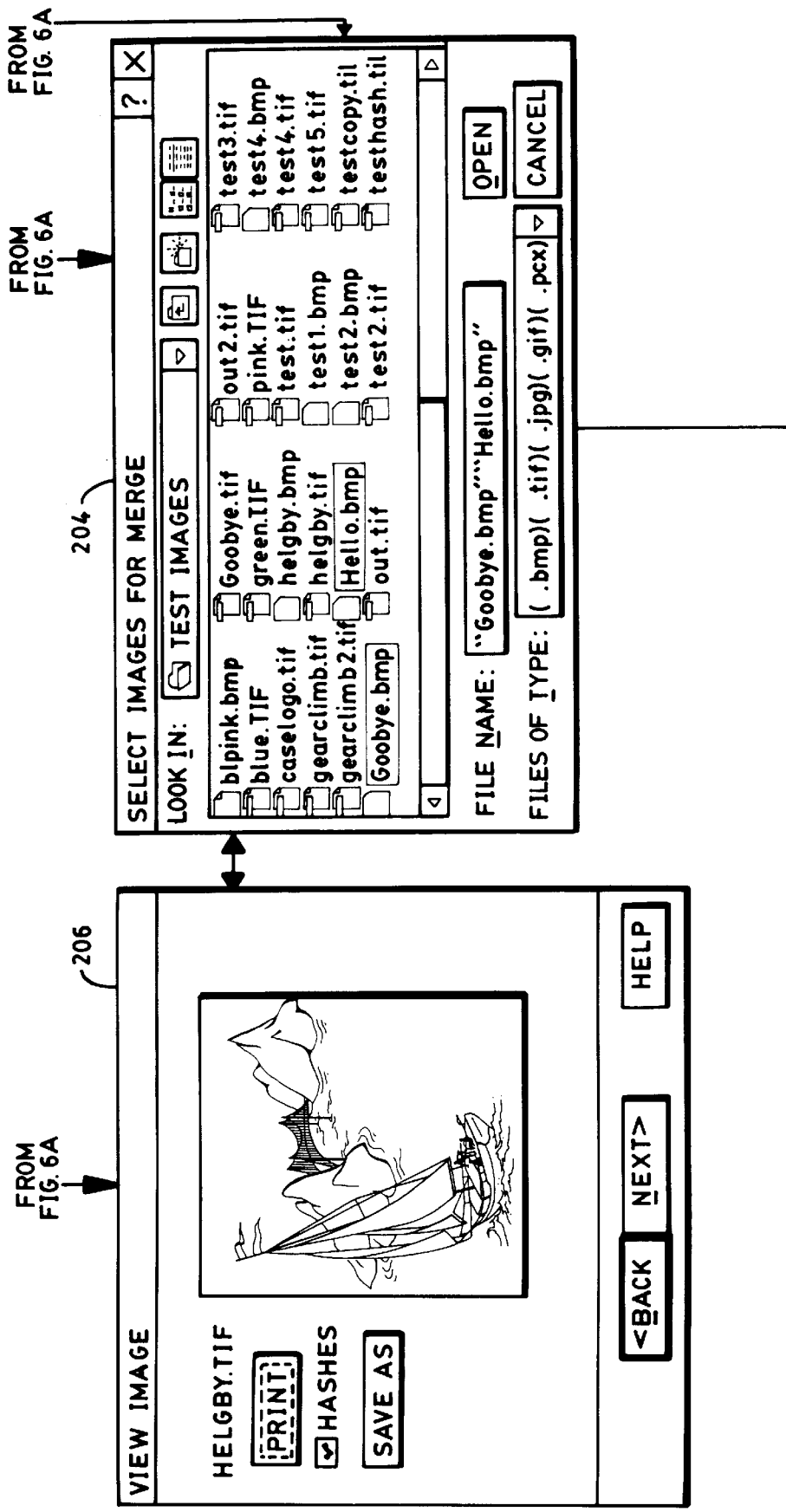
Figure 6C:
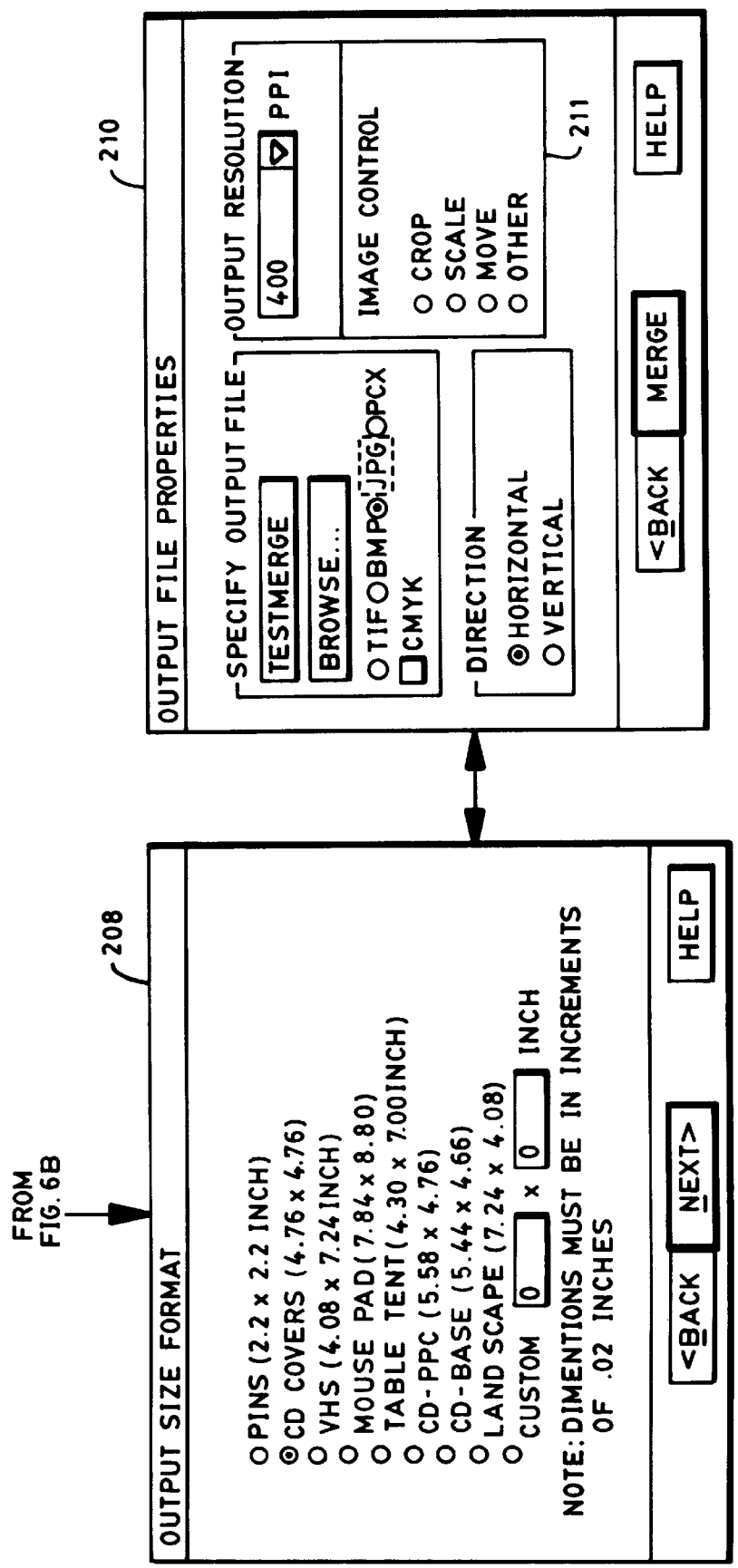

Reference is now made to FIG. 5 which shows a flowchart for a computer program that may be used in carrying out an image processing portion of the invention. FIG. 6, which will be described later, shows a flowchart with similar functionality, but in GUI screen format. It will be understood that the exact sequence of image manipulation steps indicated in FIG. 5 need not be carried out in the order shown; however, it is preferable that they precede the merge step indicated at 188. As illustrated, the steps of this embodiment of the method for implementing the image merging step of the invention comprise:

(170) Selecting And Acquiring A Number Of Input Images. In the event that there is a truncated version of the program not having all of the features of FIG. 5, such as that of image cropping to be described later, it may be necessary to reformat the image to eliminate anamorphic distortion. Therefore, if only one or a select few of the full range of plastic products is permitted, and the input image does not match the aspect ratio of that plastic product image area, an anamorphically distorted image will result unless the aspect ratio of the input images is matched with those available in the program prior to its acquisition. If this is not done, the default settings will be used and the input image data will be stretched in one azimuth. With the full functionality of the merge software, this is not a problem as will be seen hereinafter.

(172) Select Or Use Default Lenticular Spatial Frequency (preferably 50 lenticules/inch), Select Output File Pixel Resolution (Pixels/Unit Length), Output Device Printable Image Area Or Its Default Value (for letter size sheets, somewhat less than 8½ by 11), Plastic Product Image Area Or Default Form. Here, plastic products may be selected from a name list or icons and the maximum area automatically provided.

Figure 10:
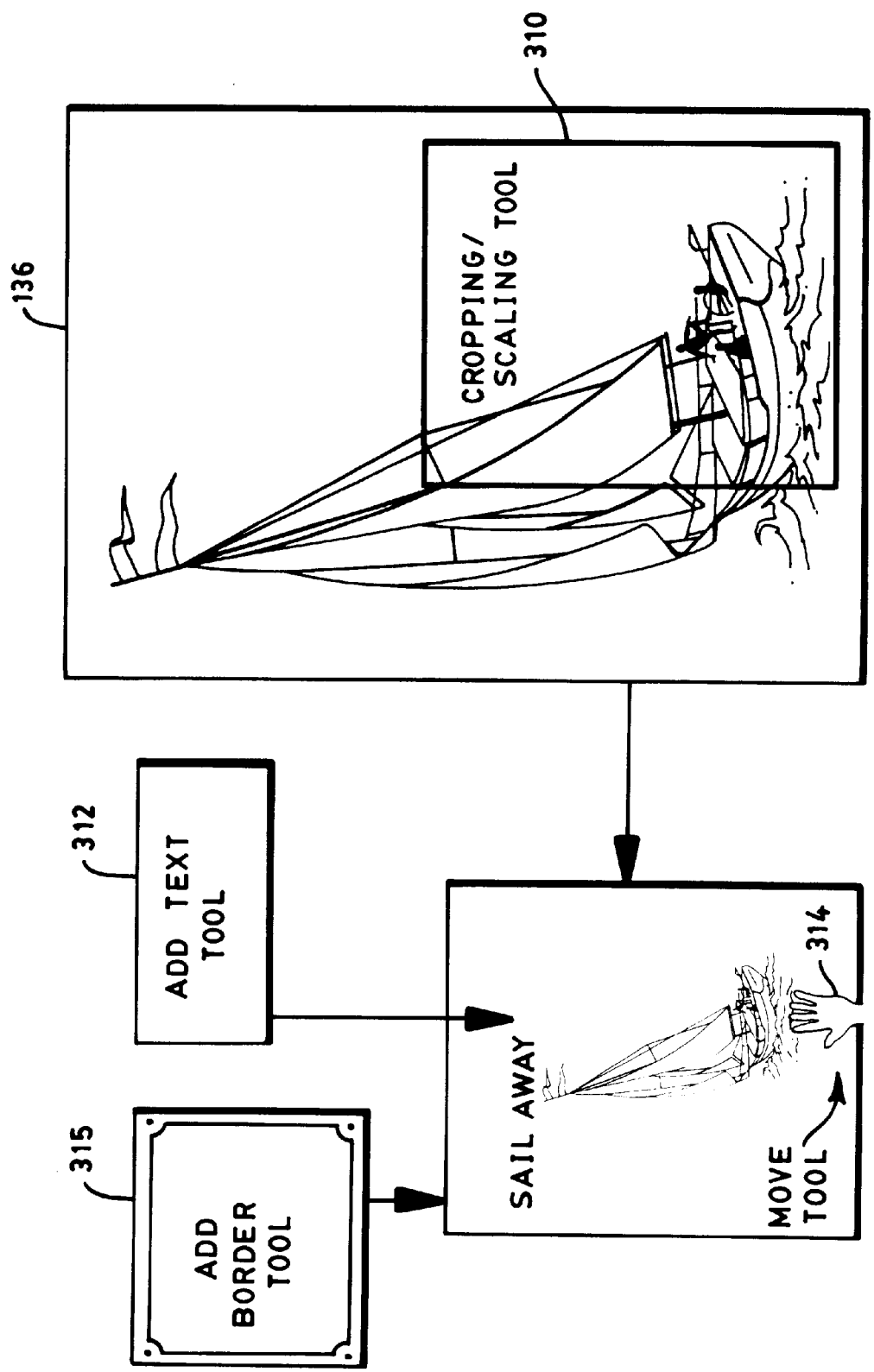
FIG. 10 is a diagrammatic view illustrating various image processing tools that can be used to format a resampled original image to compose what portion of it along with other stock image elements or text are to comprise the image contents to be used to populate one of the perspective view in the composite image.

(174) Default Fit or Crop Each Input Image If Desired For The Plastic Product Image Area Selected (Can Be Smaller Than Allowable Area—See FIG. 10). (176) Scale Each Input Image Within The Allowable Bounds Of The Plastic Product Image Area (Assuming The Same Merged Image Will Be Use Throughout—Otherwise Mix/Match—again see FIG. 10)

(178) Default Or Select And Add Any Preprogrammed Fillers (Backgrounds, Stock, Corporate Logos, Text—FIG. 10 again)

(180) Default Or Locate Each Cropped/Scaled Input Image In The Selected Plastic Product Image Area ( FIG. 10 also).

(182) Calculate The Number Of Pixels Per Image Required For Each Lenticule For The Plastic Product Image Area And Number Of Merged Images Per Printed Page (Some Of These Pixels May Have Null Values as place holders).

Figure 9:
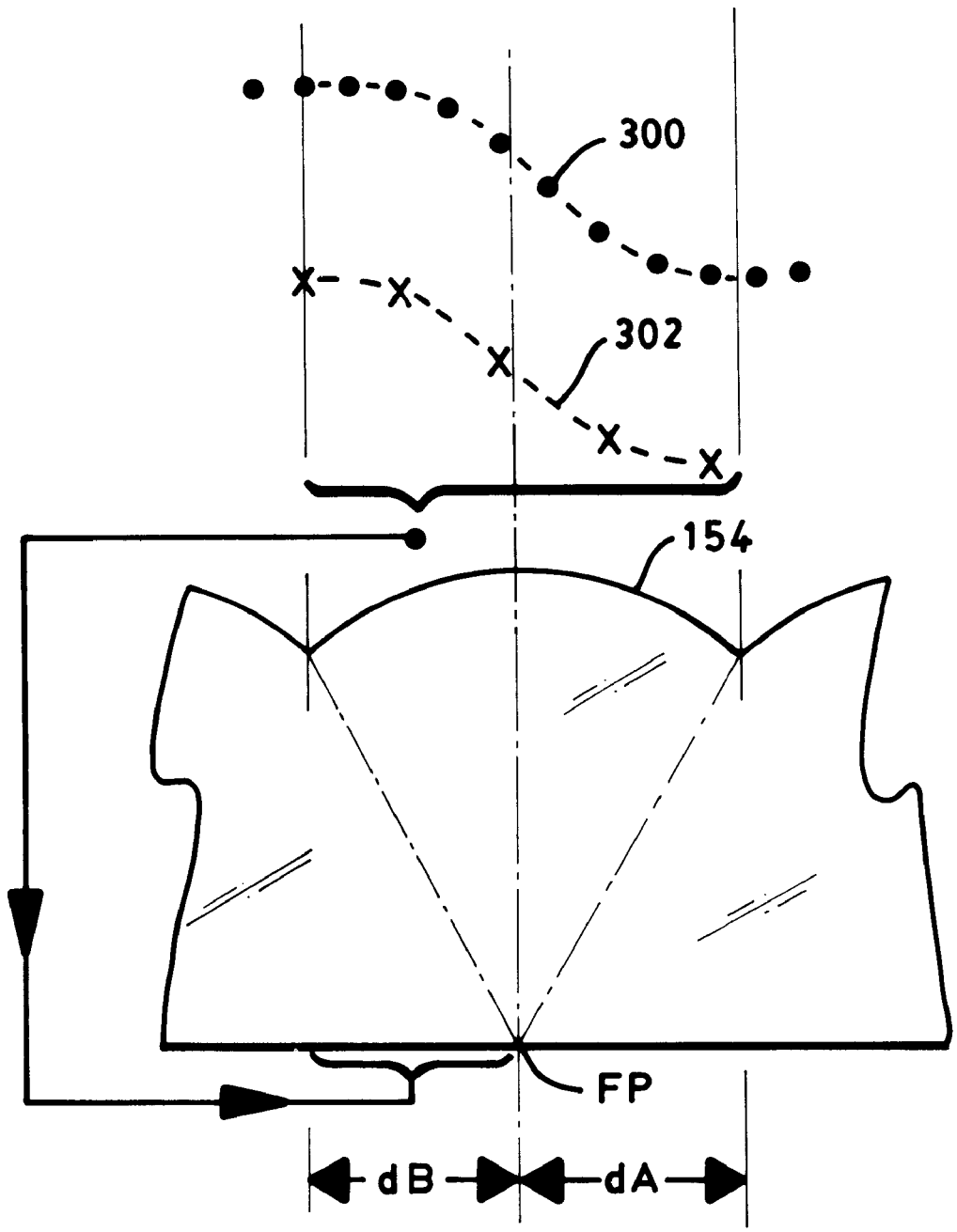
FIG. 9 is an elevational view cross-sectional view of a single lenticule and fragments of adjacent lenticules shown in conjunction with digital image data representing a single original image to be used to assemble a final composite image.

(184) Resample Each Input Image At An Appropriate Sampling Interval For All Previous Conditions, i.e. number of pixel data points required for each area to be printed) And Establish The Location For Each Pixel Point (See FIG. 9).

(186) Merge The Resampled Input Images And Generate A Merged Image File (.mrg) And Add Registration Lines As Needed Depending On The Output Image Carrying Substrate Configuration (perforated or lines added as in FIG. 2).

Figure 19:
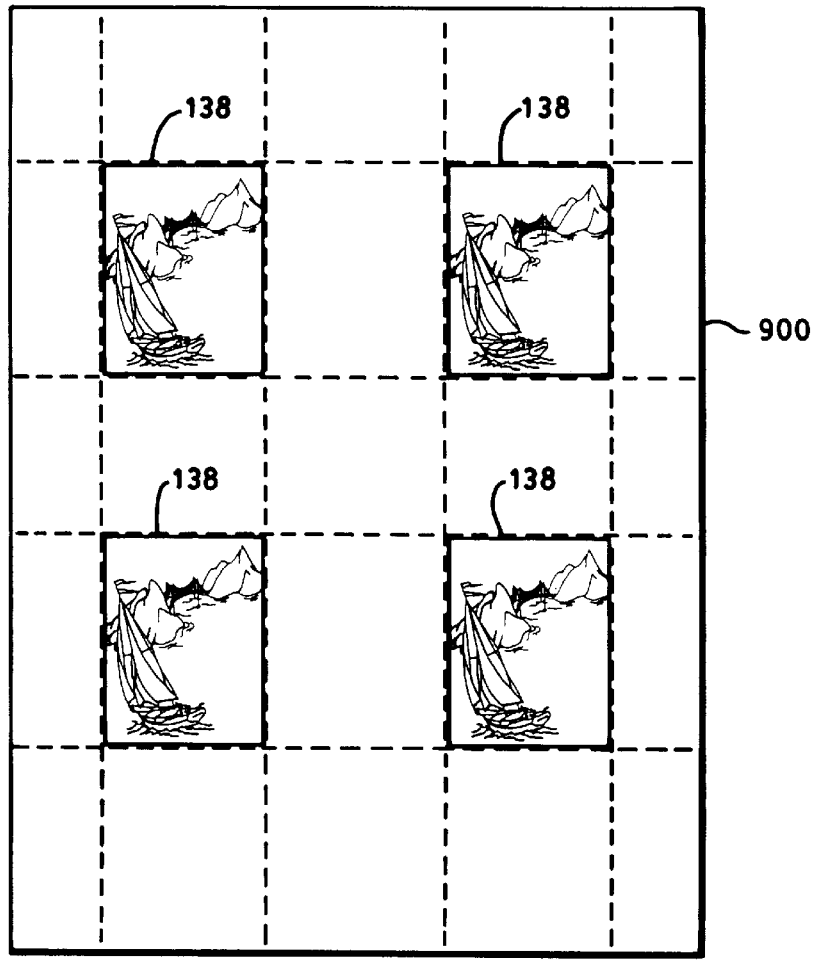
FIGS. 19 and 20 are planar views of printed sheets made in accordance with the invention and illustrate various preformatted possibilities for printing.
Figure 20:
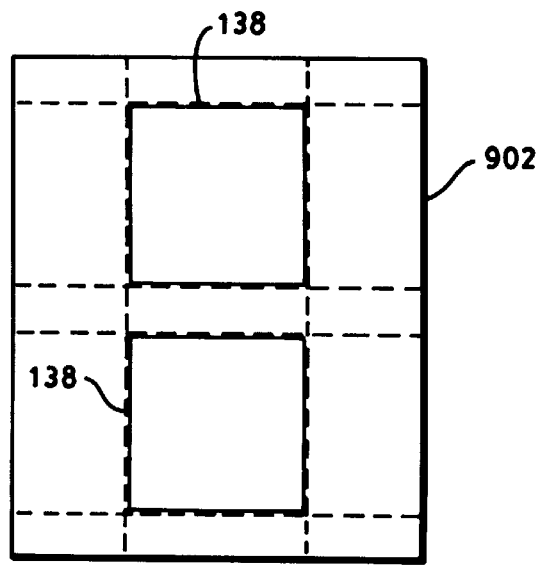

(188) Determine The Number Of Plastic Product Printable Areas That Fit Within The Output Device Printable Area And Their Layout (e.g., 1, 2, 4, etc per printed sheet (See FIGS. 19 and 20).

(190) Print, View, And/Or Save Merge File (FIGS. 1 and 2). If Saved, Select Output File Properties Linked To Prior Selections, i.e., imbed header information.

(192) Cut And/Or Fold Or Bend, Separate And/Or Fold Or Otherwise Configure For Plastic Product (194) Assemble Printed Configured Merged Image With Plastic Product To Provide Final Product.

Reference is now made to FIG. 6 which is a flowchart/screen arrangement of an implementation of the image processing program of the invention including the features of the flowchart of FIG. 5. As seen, the user is first supplied with a boot up screen 200 which carries various legal notices and attributions. Clicking on the "Next" button here sends the user to the "Select Image" screen 202. From here, the user can open, view, or print original images or previously merged images via the "View Image" screen 206. If a previously "merged" image file (.mrg) is selected in screen 202, its resolution in pixels/inch (ppi) and format size are displayed in inches.

If it is desired to create a new .mrg file, the create .mrg button is clicked in screen 202 and the :"Select Images For Merge" window 204 is opened listing files from which to original images are to be selected. The number of files that are selected is automatically stored by the program. Individual images may be viewed or printed for content via the "View Image" window 206, which can be backed out of with the "Back" button. Notice that a similar Image File window is opened in response to clicking on either the "Open Image" or "Open .mrg file" button in window 202.

Figure 7:
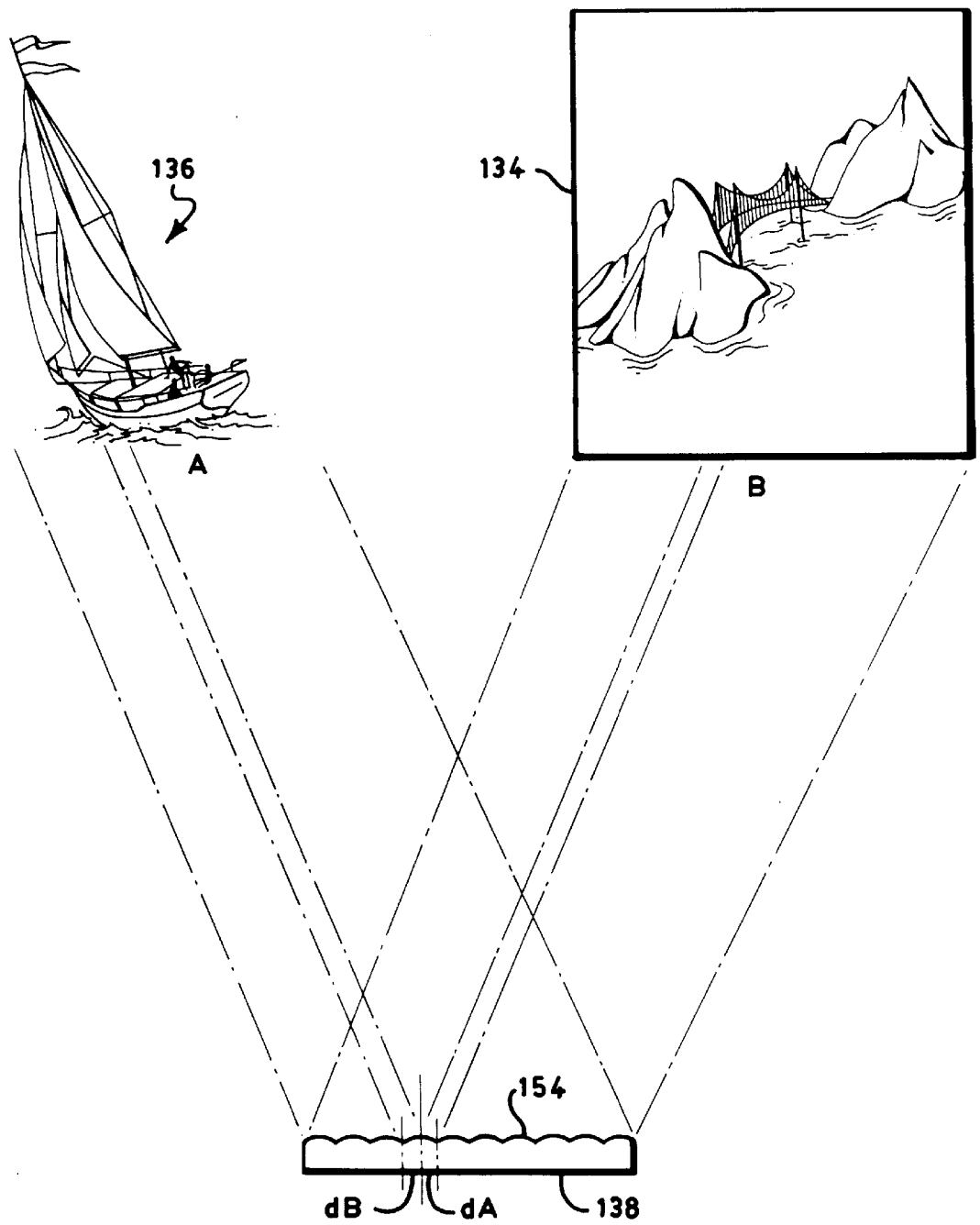
FIG. 7 is a diagrammatic view illustrating how a composite image located behind a lenticulated panel is projected piecewise to provide views of the original images from which the composite was created.
Figure 8A:
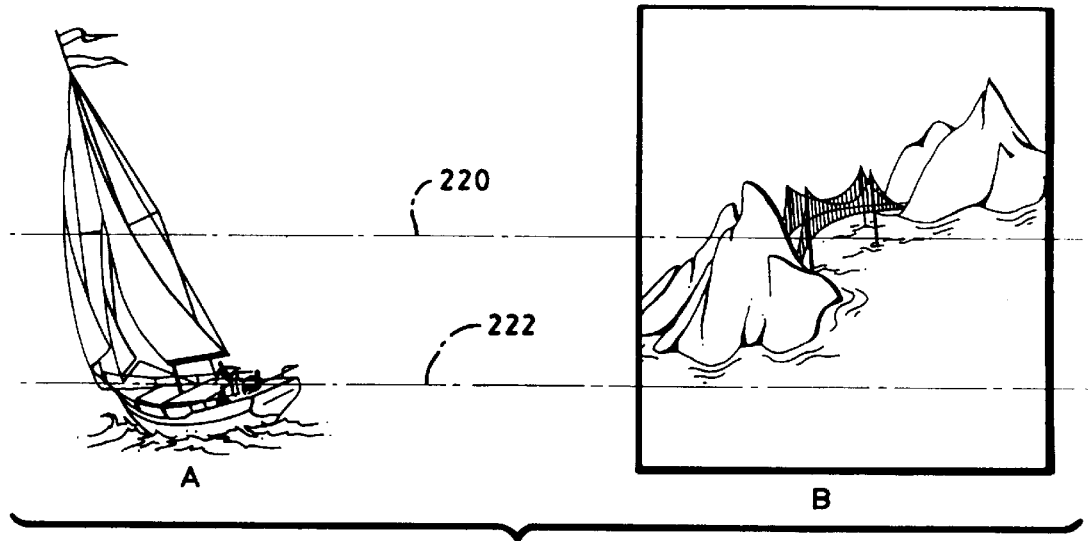
FIGS. 8A–8I are a diagrammatic view illustrating how digital signals representing the images of FIG. 7 are generated.
Figure 8B:
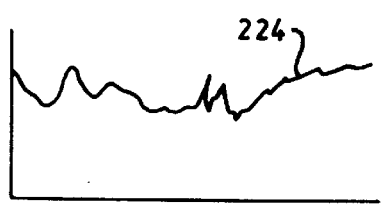
Figure 8C:
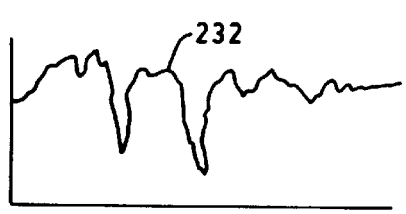
Figure 8D:
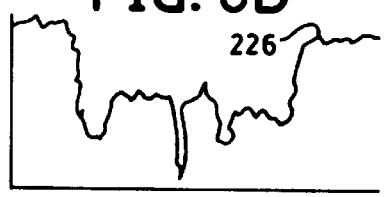
Figure 8E:
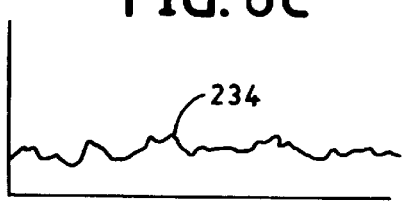
Figure 8F:
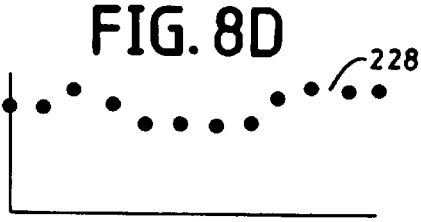
Figure 8G:
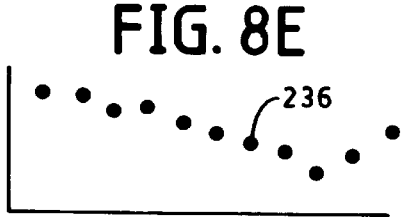
Figure 8H:
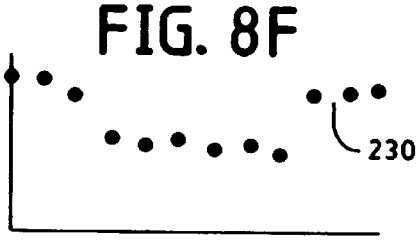
Figure 8I:
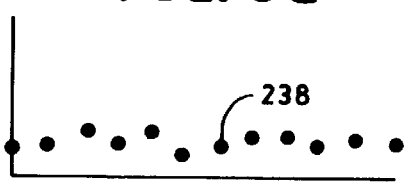

By way of example, the images that could be selected for merging could have been the bay and boat images, 134 and 136, respectively which could have had the file names "bay.tif" and "boat.tif", respectively, and these would have appeared in window 204. The way in which the composite image 138 of the bay and boat images would be displayed in conjunction with lenticules 154 is illustrated in FIG. 7. As seen there, an observer looking at the lenticules 154 from one angular perspective would be presented with the bay image "B" and from another angular perspective with the boat image "A". For this purpose, each individual lenticule 154 is provided in the manner to be described with a segment of the original images, call these dA and dB, if you will. As can be appreciated, since each dA and dB resides in the focal plane of its corresponding individual lenticule 154 and are spatially separated from one another, image segment dA is projected out to the observer along one angular direction and image segment dB along another angular direction. Taken collectively from either vantage point, the observer's visual system coalesces the collective image segments into one image that is perceptually either the bay or the boat.

With screens 208 and 210, the user determines how the image data points representing image segments dA and dB are sampled and placed in their allocated space corresponding to their physical location behind an individual lenticule to form composite image 138. This process may best be understood by referring now to FIG. 8

If you were to scan images A and B using say, a microdensitometer, along horizontal lines at regular vertical intervals, you could generate a series of electrical analog signals representing the variation in density or brightness with position in the image. For example, say you scanned both images along horizontal lines 220 and 222 that are separated vertically. The corresponding analog signals along these two horizontal scan lines could be represented by the analog signals 224 and 226, respectively, for image A and 232 and 234, respectively, for image B.

If the analog signals were digitized at some sensible sampling frequency, the corresponding digital signals for images A and B along scan lines 220 and 222 would be digital signals 228 and 230, respectively, for image A and 236 and 238, respectively, for image B. These digital signals are the type of signals that are acquired in the invention as input signals representing the original images to be converted to a composite.

Before this is done, however, the user must instruct the program about how this image data is to used, i.e., in what plastic product and hence what physical size, the desired resolution of the output merged image in pixels per inch "ppi", the direction of merge either horizontal or vertical, the output file format, and any cropping, scaling, positioning, or other additions or changes.

In screen 208, the user selects a final plastic image product from those made available. This sets the physical size in which the final image data must reside and based on the number of images to be rendered into a composite. Here, the output resolution must be some integer value of the lenticular screen spatial frequency and the number of files to be merged. For example, 50 lenticules per inch times three files would require the output resolution to be 150, 300, 450, or 600 ppi. Thus, knowing the physical image size, the output ppi, and the width of a lenticule, the program is arranged to calculate the total pixels to be occupied by the composite image. From this, one can determine how may pixel data points are available for each image for each lenticule. In FIG. 9, curve 300 represents the total number of data points that can fit behind a lenticule corresponding to one of the original images. But this also corresponds to the total number of data points available for the composite image. Say the composite image is allowed 10 pixels per lenticule. Then for two images, there are only five pixels available for each image per lenticule since two images must be projected through each lenticule 154. Therefore, some of the original data points must be discarded. In the past one simply discarded half of each of the original image data points so that portions of the two images could be placed behind a lenticule. How this was done in past (again look at curve 300 and imagine that it represents the data points for a segment dA or dB of one of the original images) was to simply discard the last five consecutive data points to provide five openings for the first five consecutive data points from the next image segment, dB. This procedure, known as interleaving, does not promote visual image quality when used with lenticular frequencies practical for injection molding, and hence the resampling procedure of the invention is preferred. Instead of discarding the information contained in the half of the data points contained in the previously discarded second consecutive data points, what is practiced here is to resample all of the available data corresponding to the full lenticular width to get data corresponding to curve 302. The five data points contained in curve 302 are then compressed to fit into one-half the lenticular width. In this way, the original image content is preserved and enhanced image quality is possible particularly via smoothing between one image segment and the next. Via this resampling procedure, information about the original image is taken into account and tends to prevent imaging artifacts such as the jaggies. Here, if image data points have to be added, well-known interpolation routines are employed, and if too much data is available, reverse interpolation or decimation is employed. Any suitable interpolation will be an improvement over traditional cut and paste techniques, and may be selected from the group comprising: linear, bilinear, cubic spline, polynomial, or those carried out in the frequency domain such as discrete cosine transforms (DCT). In addition, further smoothing of the interpolated image may be achieved by filtering or convolving in the spatial domain or their equivalent in the frequency domain.

More formally, this method involves steps of:

acquiring a plurality of input image signals each representing original images and formatted as a plurality of image data points corresponding, respectively, to the individual pixels of an image;

determining the total number of original images to reside in the composite image;

selecting an interval corresponding to the spatial frequency of a lenticular array to be used for viewing the composite image;

multiplying the spatial frequency of the lenticular array by the total number of images to reside in the composite image and determining the output pixel resolution for the composite image as an integer value of the product of the number of images and the spatial frequency to arrive at the minimum output pixel resolution in pixels per inch;

selecting the physical size of the area over which the composite image is to be reproduced in hardcopy form;

calculating the total number of pixels allowed in the physical size;

continuously sampling the original images over the physical length corresponding to the composite image at a sampling rate corresponding to the number of pixels allowed in composite divided by the total number of original images to be combined;

dividing up the data for each image into consecutive sets of pixel data points (A1, ,A3, . . . , An; B1, B2, B3, . . . ; Bn) corresponding to the total number of intervals that will fit into the physical size of the composite image; and arranging the sets imagewise in alternating consecutive sequences (A1, B1, C1; . . . ; A2, B2, C2, . . . , etc)

Returning now to FIG. 6, the user, if desired, exerts additional image control on the contents each image prior to its merger, and this is done via "Image Control" Box 211. As best seen in FIGS. 6 and 10, selecting the "Crop" function automatically provides an cropping tool in the form of a frame 310 whose aspect ratio is the same as that corresponding to that of the plastic product selected. Also, provided is a scaling tool that may be used to change the size of the cropping tool but not its aspect ratio. These two tools may be used in conjunction with one another to select what features of an original image is to displayed in that available for the selected plastic lenticulated product. A portion or all of it may be selected. If a portion is selected, a move tool 314 is provided for positioning what has been selected within the available product window. A border tool 3 14 may be used to add prestored borders, and a text tool 312 may be used to add customized text as desired. Other image processing functions may be added via window 211. Once all of original images have been composed and formatted, the composite image may be formed by clicking on the "Merge" button in screen 210.

The digital image processing steps of the invention may be implemented using any suitable computer language, and preferably through the use of Visual C$^{++}$. Examples of plastic products that may be used in the method of the invention are shown in FIGS. 11 through 17.

Figure 11:
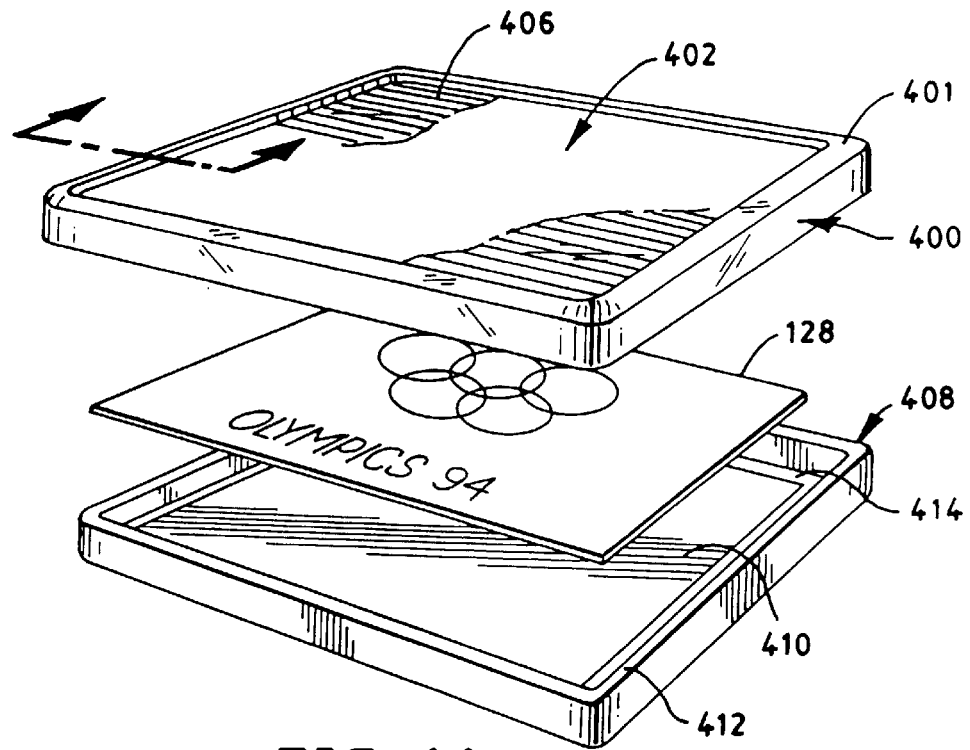
FIG. 11 is an exploded diagrammatic perspective view of a display product that may be assembled using the method of the invention.

FIG. 11 shows an exploded diagrammatic perspective view of a display product 400 that may be assembled using the method of the invention. The display product 400 is in the form of a small easel that may be used as a badge or desktop frame. It comprises a generally square top 402 having lenticules 406 surrounded by a downwardly extending flanged perimeter 401. A base member 408 has a recessed flat area 410 provided along at least one side with a reference edge 414. The final image subassembly 128 fits in the recessed flat area 410 with the reference edges of the image subassembly 128 butted against one another for alignment purposes. The top 401 snaps over the base to trap the image subassembly in place and to flatten out the image against the focal plane of the lenticules 406.

Figure 12:
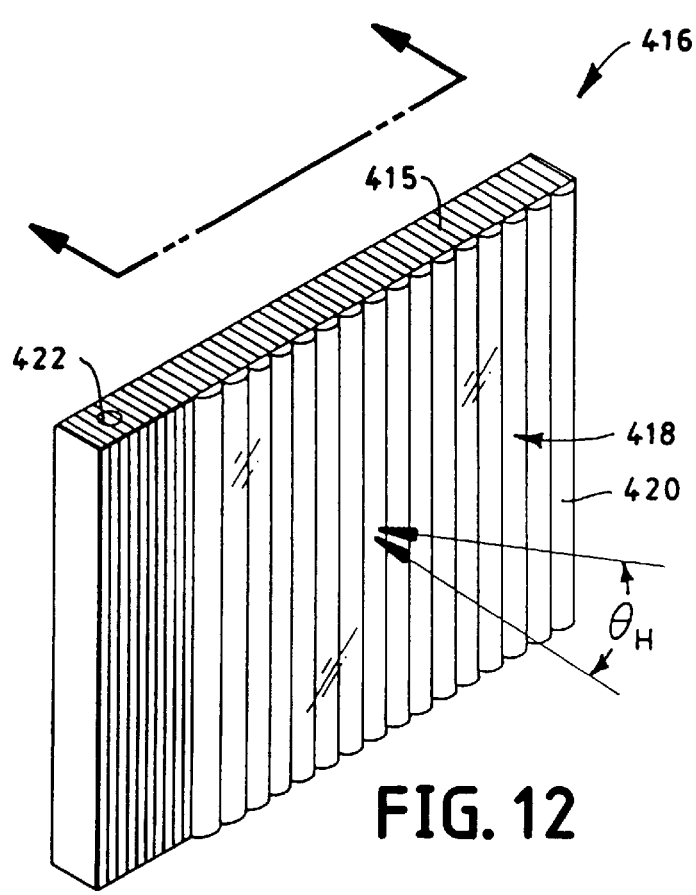
FIG. 12 is a diagrammatic perspective of a CD jewel box packaging system or the like that may be made using the method of the invention.

FIG. 12 is a diagrammatic perspective of a generally rectangular CD jewel box packaging system 416 or the like that may be made using the method of the invention. Here, box 416 operates as a container for a compact disk (CD) and comprises a front cover 415 with a lenticulated generally square panel 418 having individual lenticules 420. The front cover 415 is pivotally mounted to a base via a pivot 422. The images are retained in place in alignment with the lenticules 420 in the manner described in previously referenced commonly owned patents and patent applications.

Figure 13:
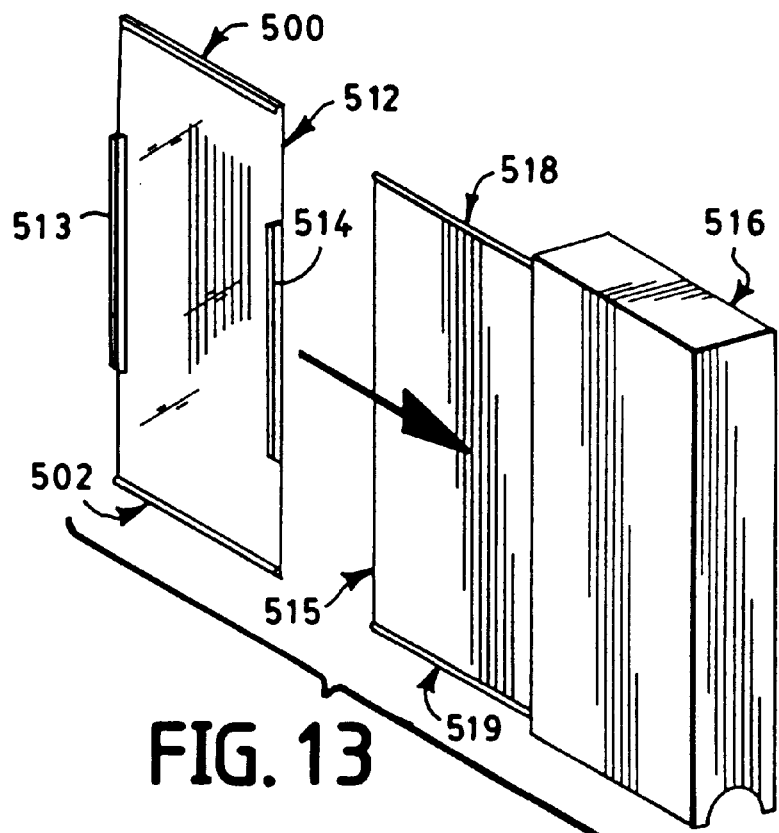
FIG. 13 is an exploded diagrammatic perspective of a VHS video packaging system or the like that may be made in accordance with the method of the invention.

FIG. 13 is an exploded diagrammatic perspective of a VHS video packaging system or the like that may be made in accordance with the method of the invention. Here, a VHS box 516 is provided with a printed composite image surface 515 located on the front side of a hinged flap. The flap has spaced apart edges 518 and 519 one of which serves as a reference edge. The other is provided with a point of contact for defining a three point alignment plane, and the flat is made to be slightly bowed so that the image carrying surface is slightly convex toward the planar side of the lenticules. A lenticulated add-on plate 512 is provided with spaced apart grooved rails 500 and 502. Side ribs 513 and 514 extend rearwardly from the lenticulated panel. The lenticulated panel slides on to the image bearing flap via the grooved flanges 500 and 502 to engage edges 518 and 519 so that the images and lenticules are aligned both longitudinally and in the focal plane.

Figure 14:
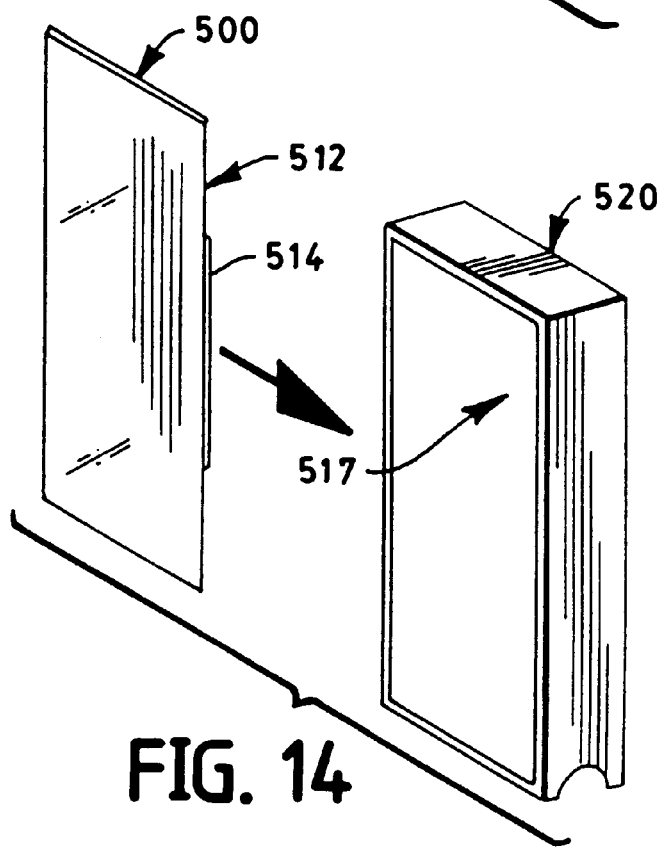
FIG. 14 is an exploded diagrammatic perspective of yet another VHS video packaging system or the like that may be made in accordance with the method of the invention.

FIG. 14 is an exploded diagrammatic perspective of yet another VHS video packaging system or the like that may be made in accordance with the method of the invention. Here, a VHS box 520 carries the composite image on a printed panel 517 instead of a hinged flap. Lenticulated panel 512 with grooved rail 500 and 514 attach using a similar principle as that shown in FIG. 13 for alignment purposes.

Figure 15:
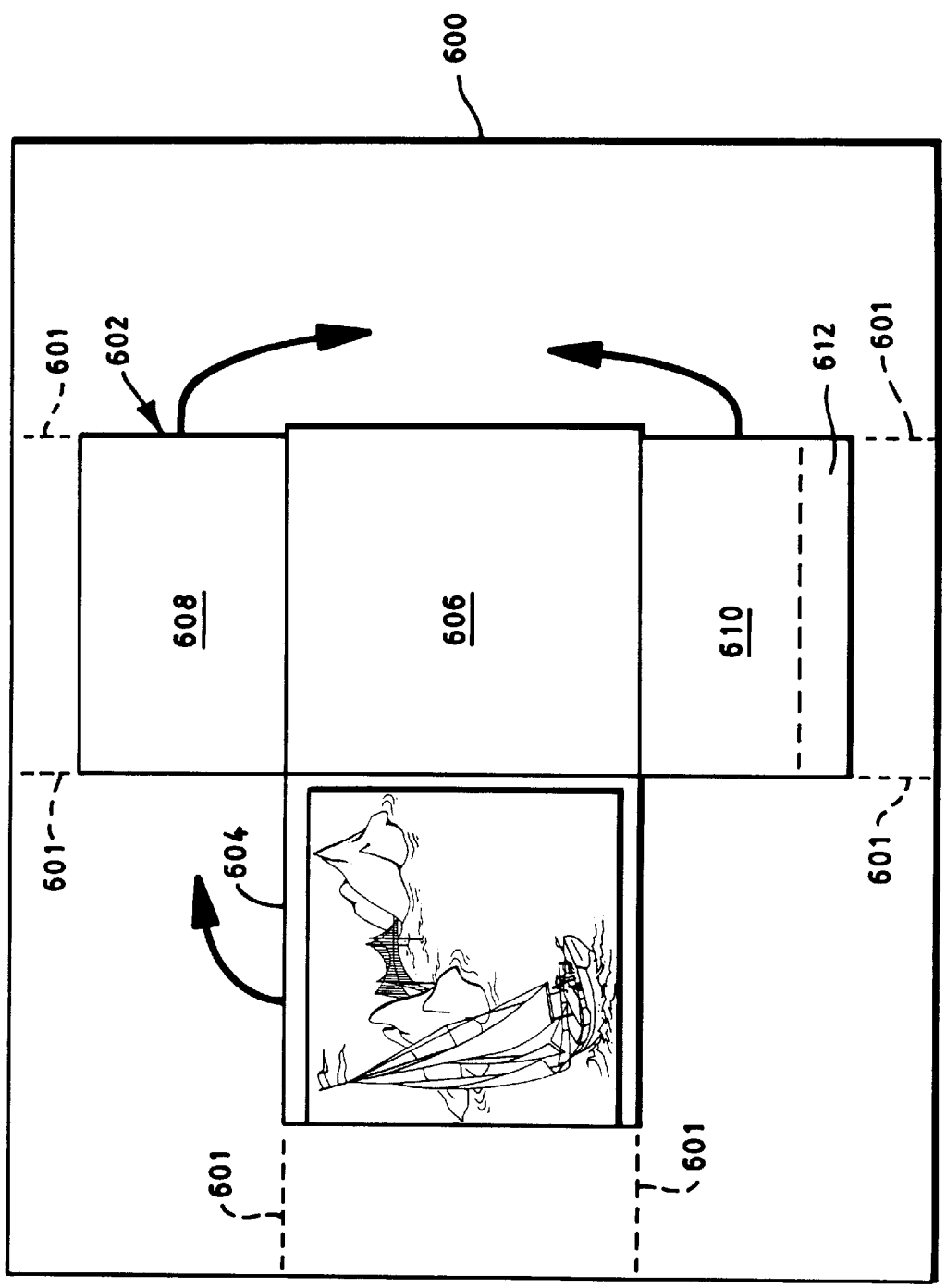
FIG. 15 is a diagrammatic planar view of a printed sheet bearing a special effects image in accordance with the invention along with preformatted perforation lines.

FIG. 15 is a diagrammatic planar view of a printed sheet 600 bearing a special effects image 138 in accordance with the invention along with preformatted perforation lines 201. Here, image 138 is printed on a panel 604 which forms part of a developments comprising other panels 606, 608, and 610 that collectively define a final image subassembly 602 to be removed from the sheet 600 along perforation lines 601 by breaking along these lines as previously explained.

Figure 16:
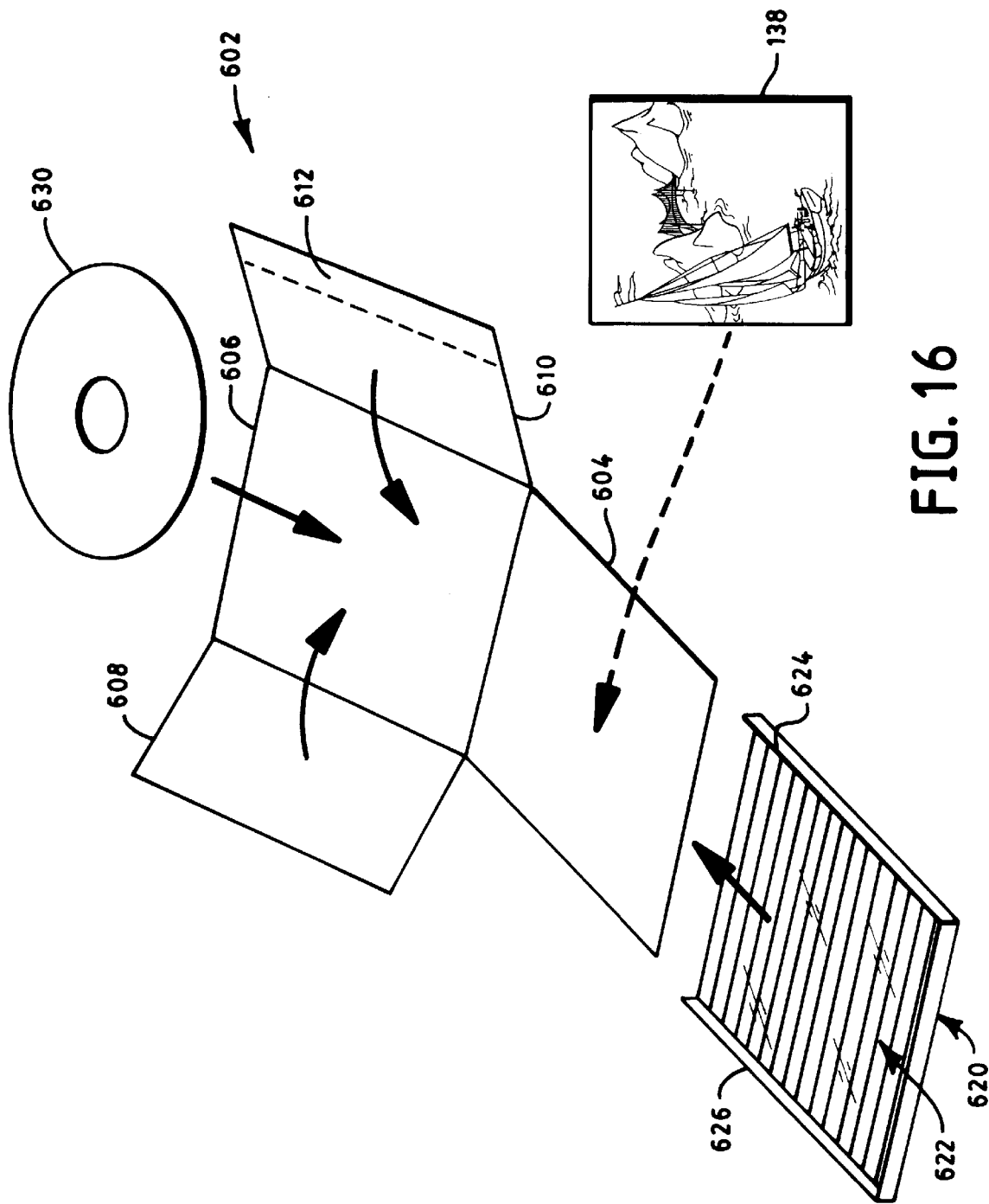
FIG. 16 is a diagrammatic exploded perspective view of a packaging product for a CD or the like that may be made by separating and then folding and attaching selected elements of the printed sheet of FIG. 15.

FIG. 16 is a diagrammatic exploded perspective view of a packaging product for a CD or the like formed from the image subassembly 602 after separation and then folding and attaching selected elements of the printed sheet of FIG. 15. Here, panels 608 and 610 fold inwardly where they are attached via a glue strip 612. Doing this forms a pocket of sleeve into which a CD 630 may be sliceable inserted for storage and removed for use. A slide on lenticulated plate 620 is provided with spaced apart grooved rails 624 and 626 respectively, that engage the edges of panel 604. Lenticules 622 in this way are aligned with the composite image 138 to provide information about and advertising for the contents recorded on the CD.

Figure 17:
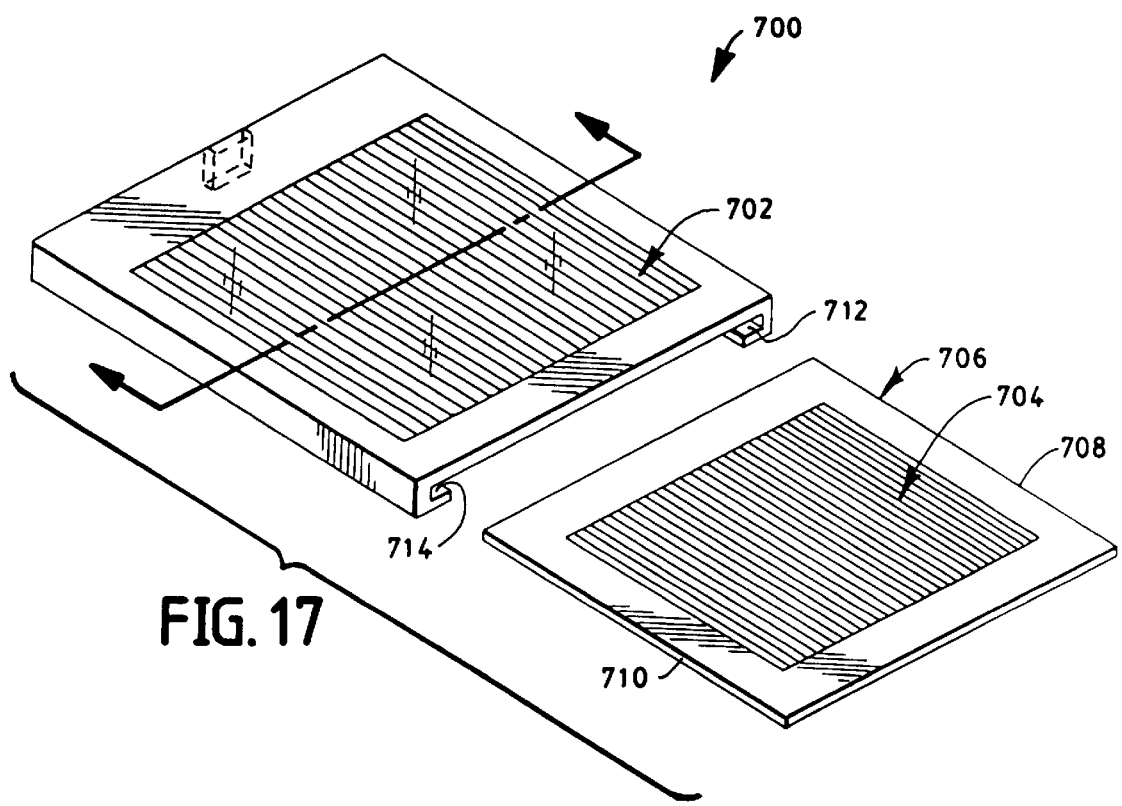
FIG. 17 is a diagrammatic perspective view of a display product for celebrity or sports personalities or the like that may be made in by the method of the invention.

FIG. 17 is a diagrammatic perspective view of a display product 700 for celebrity or sports personalities or the like that may be made by the method of the invention. Here, a lenticulated panel 702 is provided with grooved edges 712 and 714. An image carrying substrate 706 is printed with a composite image 704 and has alignment edges 708 and 710 adapted to engage grooved edges 712 and 714.

Figure 18:
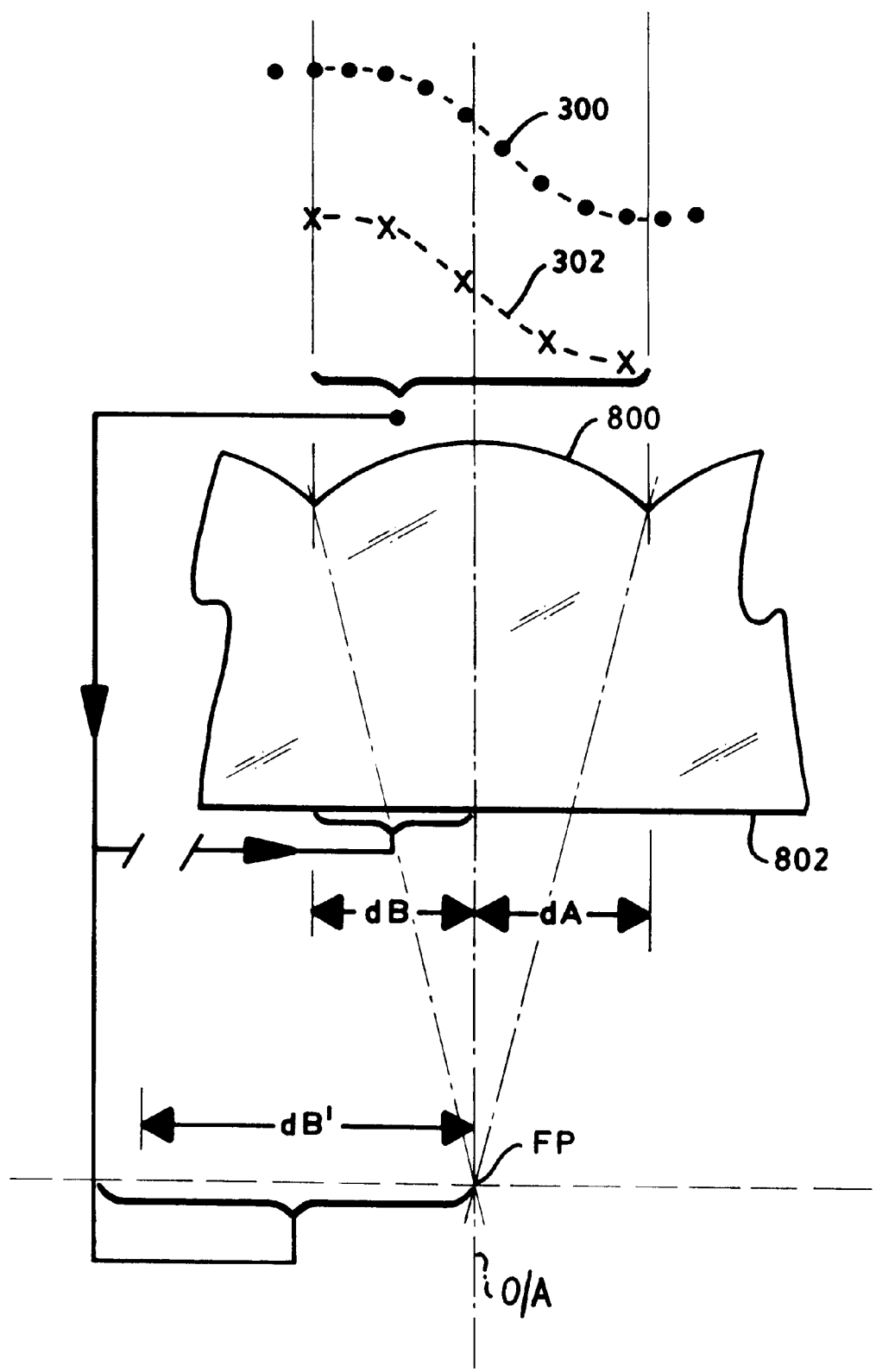
FIG. 18 is a diagrammatic view of an alternative lenticular design that may be used in conjunction with the image processing techniques of the invention to generate special visual effects.

FIG. 18 is a diagrammatic view of an alternative lenticular design that may be used in conjunction with the image processing techniques of the invention to generate special visual effects. Here, lenticules 800 are of the same general form, convex-piano, as before and have the same spatial frequency. However, the front surface radius is larger and therefore the focal length of lenticule 800 is longer. Plano surface 802, which is where the images substantially reside, is located inside of the focal point so that the apparent size of the width of a lenticule, or half a width, at the location of what would correspond to the focal point of the previous lenticule design is magnified such that the resampled image data points previously calculated are now distributed over what optically corresponds to a full lenticule width, say dB'. This is a substantial departure from the conventional approach to locate the images at the focal plane of the lenticular screen.

FIGS. 19 and 20 are planar views of printed sheets 900 and 902 made in accordance with the invention and illustrate various preformatted possibilities for printing. Sheet 900 contains four images 138 for use say in the plastic products of FIGS. 11 or 17 and sheet 902 has two images 138 for use in a plastic product such as that of FIG. 12.

Those skilled in the art may make other changes to the invention without departing from the scope of its teachings. For example, it will be apparent that input images in the manner described may be sampled in two-dimensions rather than just one. Also, it will be apparent that two-dimensional lenslets may be used instead of the cylindrical lenticules described. Therefore, it is intended that the embodiments described herein be considered as illustrative and not be construed in a limiting sense.

What is claimed is:

1. A method for making a composite image from which special imaging effects may be derived, said method comprising the steps of:

acquiring a plurality of input image signals each representing original images and formatted as a plurality of image data points corresponding, respectively, to the individual pixels of an image;

determining the total number of original images to reside in the composite image;

selecting an interval corresponding to the spatial frequency of a lenticular array to be used for viewing the composite image;

multiplying the spatial frequency of the lenticular array by the total number of images to reside in the composite image and determining the minimum output pixel resolution for the composite image as an integer value of the product of the number of images and the spatial frequency to arrive at the output pixel resolution in pixels per inch;

selecting the physical size of the area over which the composite image is to be reproduced in hardcopy form;

calculating the total number of pixels allowed in the physical size;

continuously sampling the original images over one of the physical lengths corresponding to the composite image at a sampling rate corresponding to the number of pixels allowed in composite divided by the total number of original images to be combined;

dividing up the data for each image into consecutive sets of pixel data points (A1, A2, A3, . . . , An; B1, B2, B3, . . . ; Bn) corresponding to the total number of intervals that will fit into the physical size of the composite image; and arranging the sets imagewise in alternating consecutive sequences (A1, B1, C1; . . . ; A2, B2, C2, . . . , etc) to obtain the composite image.

2. The method of claim 1 further including image processing steps selected from the group comprising cropping, scaling, moving, adding text, adding borders, and adding stock images.

3. The method of claim 1 further including the step of outputting said composite image in digital.

4. The method of claim 1 further including the step of outputting said composite image in digital form to a printer along with instructions to print said composite image in hardcopy form.

5. The method of claim 4 wherein said hardcopy is selected from the group of stock with preforations, stock to which registration lines have been added along with said composite image, and stock with a border and features defining a reference line.

6. The method of claim 4 further including the step of aligning said composite image with complementary configured features of lenticulated array for exhibiting said composite image to an observer.

7. The method of claim 6 wherein said composite image is located proximate the focal plane of said lenticulated array.

8. The method of claim 6 wherein said composite image is located away from the focal plane of said lenticulated screen so that apparent width in which the pixels of corresponding input image segments reside is magnified compared with being located proximate the focal plane of the lenticulated array.

* * * * *